United States Patent
Hidaka et al.

(10) Patent No.: US 12,322,759 B2
(45) Date of Patent: Jun. 3, 2025

(54) ELECTROLYTIC SOLUTION, LITHIUM-SULFUR SECONDARY BATTERY, AND MODULE

(71) Applicant: DAIKIN INDUSTRIES, LTD., Osaka (JP)

(72) Inventors: Tomoya Hidaka, Osaka (JP); Yoshiko Kuwajima, Osaka (JP); Shigeaki Yamazaki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 635 days.

(21) Appl. No.: 17/596,113

(22) PCT Filed: Jun. 5, 2020

(86) PCT No.: PCT/JP2020/022276
§ 371 (c)(1),
(2) Date: Dec. 3, 2021

(87) PCT Pub. No.: WO2020/246578
PCT Pub. Date: Dec. 10, 2020

(65) Prior Publication Data
US 2022/0158248 A1 May 19, 2022

(30) Foreign Application Priority Data

Jun. 5, 2019 (JP) ................. 2019-105668

(51) Int. Cl.
| | | |
|---|---|---|
| *H01M 10/0569* | (2010.01) | |
| *H01M 4/38* | (2006.01) | |
| *H01M 4/58* | (2010.01) | |
| *H01M 4/60* | (2006.01) | |
| *H01M 10/052* | (2010.01) | |
| *H01M 10/0568* | (2010.01) | |
| *H01M 4/02* | (2006.01) | |

(52) U.S. Cl.
CPC ......... *H01M 10/0569* (2013.01); *H01M 4/38* (2013.01); *H01M 4/58* (2013.01); *H01M 4/60* (2013.01); *H01M 10/052* (2013.01); *H01M 10/0568* (2013.01); *H01M 2004/028* (2013.01); *H01M 2300/0034* (2013.01)

(58) Field of Classification Search
CPC .......... H01M 10/0569; H01M 10/052; H01M 10/0568; H01M 4/38; H01M 4/58; H01M 4/60; H01M 2004/028; H01M 2300/0034
See application file for complete search history.

(56) References Cited

U.S. PATENT DOCUMENTS

| | | | | |
|---|---|---|---|---|
| 2014/0255794 A1* | 9/2014 | Zhang | ................ | H01M 4/5815 |
| | | | | 429/188 |
| 2016/0020491 A1 | 1/2016 | Dai et al. | | |
| 2018/0076485 A1 | 3/2018 | Zhang et al. | | |
| 2020/0036043 A1 | 1/2020 | Ishikawa et al. | | |

FOREIGN PATENT DOCUMENTS

| | | |
|---|---|---|
| JP | 2005-108724 A | 4/2005 |
| JP | 2010-146740 A | 7/2010 |
| JP | 2013-225496 A | 10/2013 |
| JP | 2014-041811 A | 3/2014 |
| JP | 5804557 B2 | 11/2015 |
| WO | 2018/163778 A1 | 9/2018 |

OTHER PUBLICATIONS

JP2010146740A translation (Year: 2010).*
International Search Report for PCT/JP2020/022276, dated Aug. 4, 2020.
Extended European Search Report dated May 25, 2023, issued in European Application No. 20818122.2.
Communication dated May 3, 2022 from the Taiwanese Patent Office in Application No. 109119054.
International Preliminary Report on Patentability dated Dec. 7, 2021 with a Translation of the Written Opinion of the International Searching Authority in Application No. PCT/JP2020/022276.

* cited by examiner

*Primary Examiner* — Jane J Rhee
(74) *Attorney, Agent, or Firm* — Sughrue Mion, PLLC

(57) ABSTRACT

An electrolytic solution, a lithium-sulfur secondary battery including the electrolytic solution and a module. The lithium-sulfur secondary battery has a positive electrode or a negative electrode containing a sulfur-containing electrode active material containing at least one selected from simple sulfur, lithium polysulfides ($Li_2S_n$: $1 \leq n \leq 8$) and organosulfur compounds. The electrolytic solution contains: a fluorinated ether represented by: $Rf—(OR^1)_n—O—R^2$; an ether compound represented by: $R^4—(OCHR^3CH_2)_x—OR^5$; and an alkali metal salt, wherein Rf, $R^1$, $R^2$, $R^3$, $R^4$, $R^5$, n and x are as defined herein.

11 Claims, No Drawings

ELECTROLYTIC SOLUTION, LITHIUM-SULFUR SECONDARY BATTERY, AND MODULE

CROSS REFERENCE TO RELATED APPLICATIONS

This application is a National Stage of International Application No. PCT/JP2020/022276 filed Jun. 5, 2020, claiming priority based on Japanese Patent Application No. 2019-105668 filed Jun. 5, 2019.

TECHNICAL FIELD

The present invention relates to an electrolytic solution, a lithium-sulfur secondary battery, and a module.

BACKGROUND ART

As high-capacity secondary batteries, lithium ion secondary batteries are widely used, and as higher-capacity secondary batteries, lithium-sulfur secondary batteries are being studied.

In these various types of batteries, the properties of electrolytic solution largely affect the performance of the batteries.

Patent Literature 1 discloses use of an electrolytic solution containing a specific ether compound and an alkali metal salt wherein at least parts of the ether compound and the alkali metal salt form a complex, in a lithium-sulfur secondary battery.

Patent Literature 2 discloses an electrolytic solution containing an ether, an ionic liquid and a fluorinated solvent.

Patent Literature 3 discloses use of an electrolytic solution containing tetraglyme and an alkali metal salt, in a lithium-sulfur secondary battery.

Patent Literature 4 discloses a lithium-sulfur secondary battery including a positive electrode containing simple sulfur, and a nonaqueous electrolytic solution containing at least one of a cyclic ether and a chain ether and at least one of a fluorinated carbonate and a fluorinated ester.

Non Patent Literature 1 discloses use of ethyl 1,1,2,2-tetrafluoroethyl ether as an electrolytic solution in a lithium/sulfur battery.

CITATION LIST

Patent Literature

Patent Literature 1: Japanese Patent Laid-Open No. 2013-225496
Patent Literature 2: Japanese Patent Laid-Open No. 2014-41811
Patent Literature 3: Japanese Patent No. 5804557
Patent Literature 4: Japanese Patent Laid-Open No. 2005-108724

Non Patent Literature

Non Patent Literature 1: Electrochimica Acta 161(2015), 55-62

SUMMARY OF INVENTION

Technical Problem

The present disclosure aims to provide an electrolytic solution capable of improving the output characteristics and the capacity retention, a lithium-sulfur secondary battery comprising the electrolytic solution, as well as a module.

Solution to Problem

The present disclosure is an electrolytic solution to be used for a battery having a positive electrode or a negative electrode containing a sulfur-containing electrode active material containing at least one selected from the group consisting of simple sulfur, lithium polysulfides ($Li_2S_n$: $1 \leq n \leq 8$) and organosulfur compounds, the electrolytic solution comprising:

a fluorinated ether represented by formula (1):

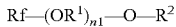

wherein Rf is an alkyl group having a fluorine atom and optionally forming a branch or a ring having 1 to 5 carbon atoms; $R^1$ is an alkyl group optionally having a fluorine atom; $R^2$ is an alkyl group having no fluorine atom, having 1 to 9 carbon atoms and optionally forming a branch or a ring; $n_1$ is 0, 1 or 2; and the number of carbon atoms in one molecule is 5 or more;

an ether compound represented by formula (2):

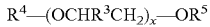

wherein $R^4$ and $R^5$ are each independently selected from the group consisting of alkyl groups having 1 to 9 carbon atoms and having no fluorine atom, a phenyl group optionally substituted by a halogen atom and a cyclohexyl group optionally substituted by a halogen atom, and optionally together form a ring; $R^3$ each independently represents H or $CH_3$; and x represents 0 to 10; and an alkali metal salt.

The fluorinated ether is preferably at least one selected from the group consisting of $HCF_2CF_2OCH_2CH_2CH_3$, $HCF_2CF_2OCH_2CH_2CH_2CH_3$, $HCF_2CF_2CH_2OCH_2CH_3$, $HCF_2CF_2CH_2OCH_2CH_2CH_3$, $HCF_2CF_2CH_2OCH_2CH_2CH_2CH_3$, $CF_3CHFCF_2OCH_2CH_3$ and $CF_3CHFCF_2OCH_2CH_2CH_3$.

The fluorinated ether represented by the formula (1) and the ether compound represented by the formula (2) in total is preferably 60% by weight or more of a solvent in the electrolytic solution.

The ether compound is preferably at least one selected from the group consisting of tetrahydrofuran (THF), 1,3-dioxolane, 1,4-dioxane, glymes, and derivatives thereof.

The alkali metal salt is represented by LiX; and X is preferably at least one selected from the group consisting of Cl, Br, I, $BF_4$, $PF_6$, $CF_3SO_3$, $ClO_4$, $CF_3CO_2$, $AsF_6$, $SbF_6$, $AlCl_4$, bistrifluoromethanesulfonylamide (TFSA), $N(CF_3SO_2)_2$, $N(CF_3CF_2SO_2)_2$, $PF_3(C_2F_5)_3$, $N(FSO_2)_2$, $N(FSO_2)(CF_3SO_2)$, $N(CF_3CF_2SO_2)_2$, $N(C_2F_4S_2O_4)$, $N(C_3F_6S_2O_4)$, $N(CN)_2$, $N(CF_3SO_2)(CF_3CO)$, $R^6FBF_3$ wherein $R^6F$ is n-$C_mF_{2m+1}$ and m is a natural number of 1 to 4, and $R^7BF_3$ wherein $R^7$ is n-$C_pH_{2p+1}$ and p is a natural number of 1 to 5.

The present disclosure is also a lithium-sulfur secondary battery comprising the above-mentioned electrolytic solution.

The lithium-sulfur secondary battery preferably includes a positive electrode containing a sulfur-containing electrode active material.

The present disclosure is also a module comprising the above-mentioned lithium-sulfur secondary battery.

Advantageous Effects of Invention

The present disclosure enables to provide an electrolytic solution capable of improving the output characteristics and the capacity retention. A lithium-sulfur secondary battery including the electrolytic solution of the present disclosure provides good battery output.

DESCRIPTION OF EMBODIMENTS

Hereinafter, the present disclosure will be described in detail.

The present disclosure relates to an electrolytic solution to be used in various types of batteries such as lithium-sulfur secondary batteries.

In particular, in lithium-sulfur secondary batteries, it is said that the discharge capacity is lowered by repetition of charge and discharge due to dissolving-out into an electrolytic solution of lithium polysulfide ($Li_2S_n$) generated by the electrode reaction in charge and discharge, making the battery life short. Hence, there has been studied the use of fluorine-containing compounds low in the dissolving capability of lithium polysulfide ($Li_2S_n$) in an electrolytic solution.

In the lithium-sulfur secondary batteries, when the viscosity of an electrolytic solution is made low, it becomes easy for the electrolytic solution to penetrate the innermost of a sulfur-carbon composite electrode, and there is thereby enlarged the interface where the electrode and the electrolytic solution can react electrochemically. It is presumed that hence, the internal resistance of the batteries is reduced and the input/output density in charging and in discharging is improved. In the present disclosure, from these viewpoints, by using a fluorinated ether low in viscosity among fluorine-containing compounds low in the dissolving capability of lithium polysulfide ($Li_2S_n$), the battery performance can be improved.

(Fluorinated Ether)

The electrolytic solution of the present disclosure is characterized by comprising a fluorinated ether represented by the following general formula (1):

$$Rf-(OR^1)_n-O-R^2 \quad (1)$$

wherein Rf is an alkyl group having a fluorine atom and optionally forming a branch or a ring having 1 to 5 carbon atoms; $R^1$ is an alkyl group optionally having a fluorine atom; $R^2$ is an alkyl group having no fluorine atom, having 1 to 9 carbon atoms and optionally forming a branch or a ring; n is 0, 1 or 2; and the number of carbon atoms in one molecule is 5 or more. The compound is, as compared with various types of fluorine-containing solvents used in lithium sulfur batteries, a compound which can make the viscosity of the electrolytic solution to be low and can improve the battery performance by the above-mentioned action. Further, the use of the compound having 5 or more carbon atoms in one molecule brings about an advantage of exhibiting a boiling point suitable for a practical operation temperature region. The upper limit of the number of carbon atoms is not limited, and the upper limit is preferably 6 since the viscosity rises and the miscibility with a Li salt decreases with increasing molecular weight.

Among the above compounds, in the point of the viscosity, $HCF_2CF_2OCH_2CH_2CH_3$ and $HCF_2CF_2OCH_2CH_2CH_2CH_3$ are especially preferable.

Compounds represented by the above formula (1) are not limited, and examples thereof include $HCF_2CF_2OCH_2CH_2CH_3$, $HCF_2CF_2OCH_2CH_2CH_2CH_3$, $HCF_2CF_2CH_2OCH_2CH_3$, $HCF_2CF_2CH_2OCH_2CH_2CH_3$,  $HCF_2CF_2CH_2OCH_2CH_2CH_2CH_3$, $CF_3CHFCF_2OCH_2CH_3$ and $CF_3CHFCF_2OCH_2CH_2CH_3$. Two or more compounds among these compounds may be mixed and used.

The compounds represented by the above (1) are limited to compounds having 5 or more carbon atoms, but alternatively, the compounds may contain, in the range of not impairing the advantageous effects of the present disclosure, a fluorinated ether represented by the above formula (1) and having 4 or less carbon atoms.

Examples of the fluorinated ether having 4 or less carbon atoms include $HCF_2CF_2OCH_2CH_3$.

The fluorinated ether to be used in the present disclosure is limited to a compound represented by the above (1), but alternatively, the fluorinated ether may contain, in the range of not impairing the advantageous effects of the present disclosure, a fluorinated ether represented by:

$$Rf1-(OR^1)_{n1}-O-Rf2 \quad (1\text{-}1)$$

wherein Rf1 and Rf2 are alkyl groups having a fluorine atom, which are identical or different; $R^1$ is an alkyl group optionally having a fluorine atom; $n_1$ is 0, 1 or 2; and the number of carbon atoms in one molecule is 5 or more. Examples of the fluorinated ether like (1-1) include $HCF_2CF_2CH_2OCF_2CHFCF_3$, $HCF_2CF_2CH_2OCF_2CF_2H$, $CF_3CF_2CH_2OCF_2CHFCF_3$, $CF_3CF_2CH_2OCF_2CF_2H$, $HCF_2CF_2OC_2H_5$, $HCF_2CF_2OC_2H_5OCF_2CF_2H$ and  $CF_3OC_2H_5OCF_3$.

It is preferable that the above fluorinated ether is contained in a proportion of 0.1 to 90% by weight in the electrolytic solution. With the proportion in this range, the electrolytic solution can be used as a good electrolytic solution. The lower limit thereof is more preferably 5% by weight and still more preferably 10% by weight. The upper limit thereof is more preferably 80% by weight and still more preferably 60% by weight.

(Ether Compound)

The electrolytic solution of the present disclosure comprises a specific ether compound not corresponding to the above-mentioned fluorinated ether. With regard to that the formation of a complex of the ether compound with an alkali metal salt provides the electrochemical stability, resulting in improving the battery performance, some prior literatures disclose the improvement.

Also in the present disclosure, the electrolytic solution containing the ether compound not corresponding to the above-mentioned fluorinated ether can attain such an effect.

The ether compound is represented by the following general formula (2):

$$R^4-(OCHR^3CH_2)_x-OR^5 \quad (2)$$

wherein $R^4$ and $R^5$ are each independently selected from the group consisting of alkyl groups having 1 to 9 carbon atoms and having no fluorine atom, a phenyl group optionally substituted by a halogen atom and a cyclohexyl group optionally substituted by a halogen atom, and optionally together form a ring; $R^3$ each independently represent H or $CH_3$; and x represents 0 to 10. Note that the ether compound used here is limited to one not corresponding to a compound represented by the above-mentioned formula (1).

The alkyl group in the above formula includes a methyl group, an ethyl group, a propyl group, an isopropyl group, a butyl group, an isobutyl group, a pentyl group, an isopentyl group, a hexyl group, a heptyl group, an octyl group and a nonyl group. When the number of carbon atoms of the alkyl group exceeds 9, since the polarity of the ether compound becomes weak, the dissolvability of an alkali metal salt is likely to lower. Hence, it is preferable that the number of  carbon atoms of the alkyl group is low; and preferable are a methyl group and an ethyl group, and most preferable is a methyl group.

The phenyl group optionally substituted by a halogen atom is not limited, and includes a 2-chlorophenyl group, a 3-chlorophenyl group, a 4-chlorophenyl group, a 2,4-dichlorophenyl group, a 2-bromophenyl group, a 3-bromophenyl group, a 4-bromophenyl group, a 2,4-dibromophenyl group, a 2-iodophenyl group, a 3-iodophenyl group, a 4-iodophenyl group and a 2,4-iodophenyl group.

The cyclohexyl group optionally substituted by a halogen atom is not limited, includes a 2-chlorocyclohexyl group, a 3-chlorocyclohexyl group, a 4-chlorocyclohexyl group, a 2,4-dichlorocyclohexyl group, a 2-bromocyclohexyl group, a 3-bromocyclohexyl group, a 4-bromocyclohexyl group, a 2,4-dibromocyclohexyl group, a 2-iodocyclohexyl group, a 3-iodocyclohexyl group, a 4-iodocyclohexyl group and a 2,4-diiodocyclohexyl group.

$R^3$ represents H or $CH_3$, and in the case where x is 2 or more, are independent of each other.

x represents 0 to 10, and represents the repeating number of an ethylene oxide unit. x is preferably 1 to 6, more preferably 2 to 5 and most preferably 3 or 4.

Examples of the ether compound include tetrahydrofuran (THF), 1,3-dioxolane, 1,4-dioxane, glymes, and derivatives thereof.

The ether compounds represented by the above general formula may together form a ring, and this ring compound includes, in the case where x is 0, tetrahydrofuran (THF) and a derivative thereof, 2-methyltetrahydrofuran, and in the case where x is 1, 1,3-dioxolane and 1,4-dioxane.

The glymes are represented by the above general formula (2) (provided that $R^3$ represents H, x represents 1 or more, and the glymes are linear compounds), and include monoglyme (G1, x=1), diglyme (G2, x=2), triglyme (G3, x=3) and tetraglyme (G4, x=4). The monoglyme (G1) include methylmonoglyme and ethylmonoglyme; and the diglyme (G2) include ethyldiglyme and butyldiglyme.

The use of a glyme in which x is 1 to 10 as the ether compound can further improve the thermal stability, the ionic conductivity and the electrochemical stability of the electrolytic solution and can make the electrolytic solution capable of withstanding high voltages.

The ether compound to be used for the electrolytic solution may be used singly in one kind, or may be used in a mixture form of two or more kinds.

It is preferable that the ether compound is contained in a proportion of 5 to 90% by weight in the electrolytic solution. With the proportion in this range, the electrolytic solution can be used as a good electrolytic solution. The lower limit thereof is more preferably 10% by weight and still more preferably 20% by weight. The upper limit thereof is more preferably 80% by weight and still more preferably 60% by weight.

Then, in view of excellent capacity retention, it is preferable that the fluorinated ether represented by the formula (1) and the ether compound represented by the formula (2) in total is 80% by weight or more with respect to the total amount of the electrolytic solution.

Further it is preferable that the amount of carbonates is less than 20% by weight with respect to the total amount of the electrolytic solution.

(Alkali Metal Salt)

The electrolytic solution of the present disclosure comprises an alkali metal salt.

The alkali metal salt can be represented by MX, and is a substance in which M is an alkali metal and X is an anion of the ion pair. The alkali metal salt may be used singly in one kind, or may be used in a mixture form of two or more kinds.

It is especially preferable that the alkali metal salt is a lithium salt (that is, a compound represented by LiX).

X is not limited, and preferable is at least one selected from the group consisting of Cl, Br, I, $BF_4$, $PF_6$, $CF_3SO_3$, $ClO_4$, $CF_3CO_2$, $AsF_6$, $SbF_6$, $AlCl_4$, bistrifluoromethanesulfonylamide (TFSA), $N(CF_3SO_2)_2$, $N(CF_3CF_2SO_2)_2$, $PF_3(C_2F_5)_3$, $N(FSO_2)_2$, $N(FSO_2)(CF_3SO_2)$, $N(CF_3CF_2SO_2)_2$, $N(C_2F_4S_2O_4)$, $N(C_3F_6S_2O_4)$, $N(CN)_2$, $N(CF_3SO_2)(CF_3CO)$, $R_4FBF_3$ (wherein $R_4F$ is n-$C_mF_{2m+1}$, where m is a natural number of 1 to 4 and n stands for normal) and $R_5BF_3$ (wherein $R_5$ is n-$C_pH_{2p+1}$, where p is a natural number of 1 to 5 and n stands for normal). In the point of the dissolvability to the ether compound and the ease of formation of a complex structure, more preferable are $N(CF_3SO_2)_2$, $N(CF_3CF_2SO_2)_2$, TFSA and $PF_6$.

It is preferable that the alkali metal salt is contained in a proportion of 3.0 to 30% by weight in the electrolytic solution. With the proportion in this range, the electrolytic solution can be used as a good electrolytic solution. The lower limit thereof is more preferably 5.0% by weight and still more preferably 8.0% by weight. The upper limit thereof is more preferably 20% by weight and still more preferably 15% by weight.

Then in the electrolytic solution of the present disclosure, it is preferable that the mixing ratio ((fluorinated ether)/(alkali metal salt)) of the fluorinated ether and the alkali metal salt has a lower limit of 0.1 and an upper limit of 5.0 (in terms of molar ratio). When the mixing ratio is in this range, since the coordination of the fluorinated ether to the alkali metal ion is good, the case is preferable. It is more preferable that the mixing ratio has a lower limit of 0.5 and an upper limit of 4.0.

Then, in the electrolytic solution of the present disclosure, it is preferable that the mixing ratio ((alkali metal salt)/(ether compound)) of the ether compound and the alkali metal salt has a lower limit of 0.1 and an upper limit of 3.0 (in terms of molar ratio).

When the mixing ratio is in this range, since the electrochemical stability is especially good, the case is preferable. It is more preferable that the mixing ratio has a lower limit of 0.5 and an upper limit of 1.0.

(Other Components)

Alternatively, the electrolytic solution of the present disclosure, as required, may concurrently use other components, in addition to the above-mentioned fluorinated ether, ether compound and alkali metal salt.

It is preferable that the electrolytic solution contains at least one selected from the group consisting of fluorinated saturated cyclic carbonates, fluorinated chain carbonates and fluorinated esters, because their use makes the cycle performance further excellent and further lowers the overvoltage.

It is preferable that the at least one selected from the group consisting of fluorinated saturated cyclic carbonates, fluorinated chain carbonates and fluorinated esters is contained in 0.01 to 10% by weight with respect to the electrolytic solution. The content is more preferably 0.5% by weight or more, and more preferably 3.0% by weight or less. In the case where two or more kinds thereof are contained, it is preferable that the total amount falls within the above range.

As the fluorinated saturated cyclic carbonates, preferable are ones represented by the formula (3):

[Formula 1]

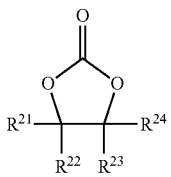
(3)

wherein $R^{21}$ to $R^{24}$ are identical or different and each represent —H, —CH$_3$, —F, a fluorinated alkyl group optionally having an ether bond, or a fluorinated alkoxy group optionally having an ether bond; provided that at least one of $R^{21}$ to $R^{24}$ is —F, a fluorinated alkyl group optionally having an ether bond, or a fluorinated alkoxy group optionally having an ether bond.

The fluorinated alkyl group is preferably one having 1 to 10 carbon atoms, more preferably one having 1 to 6 carbon atoms and still more preferably one having 1 to 4 carbon atoms.

The fluorinated alkyl group may be linear or branched chain.

The fluorinated alkoxy group is preferably one having 1 to 10 carbon atoms, more preferably one having 1 to 6 carbon atoms and still more preferably one having 1 to 4 carbon atoms.

The fluorinated alkoxy group may be linear or branched chain.

$R^{21}$ to $R^{24}$ are identical or different and are preferably each at least one selected from the group consisting of —H, —CH$_3$, —F, —CF$_3$, —C$_4$F$_9$, —CHF$_2$, —CH$_2$F, —CH$_2$CF$_2$CF$_3$, —CH$_2$—CF(CF$_3$)$_2$, —CH$_2$—O—CH$_2$CHF$_2$CF$_2$H, —CH$_2$CF$_3$ and —CF$_2$CF$_3$.

In this case, at least one of $R^{21}$ to $R^{24}$ is at least one selected from the group consisting of —F, —CF$_3$, —C$_4$F$_9$, —CHF$_2$, —CH$_2$F, —CH$_2$CF$_2$CF$_3$, —CH$_2$—CF(CF$_3$)$_2$, —CH$_2$—O—CH$_2$CHF$_2$F$_2$H, —CH$_2$CF$_3$ and —CF$_2$CF$_3$.

The fluorinated saturated cyclic carbonate is preferably at least one selected from the group consisting of the following compounds.

[Formula 2]

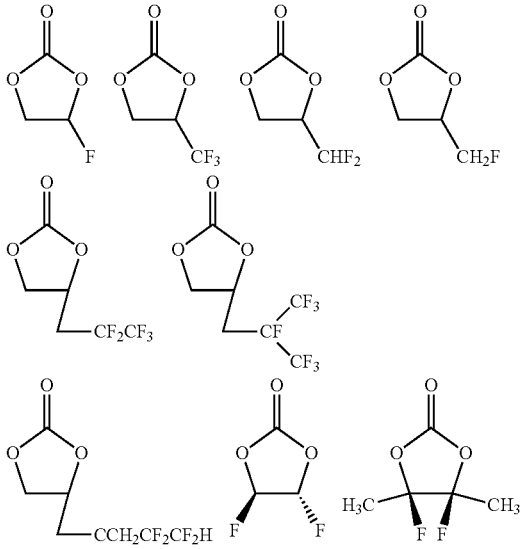

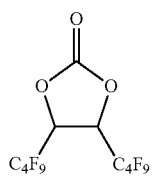

As the fluorinated chain carbonates, preferable are ones represented by the formula (4):

[Formula 3]

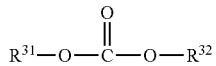
(4)

wherein $R^{31}$ and $R^{32}$ are identical or different and each represent an alkyl group optionally having an ether bond and optionally having a fluorine atom; provided that either one of $R^{31}$ and $R^{32}$ has a fluorine atom.

The alkyl group is preferably one having 1 to 10 carbon atoms, more preferably one having 1 to 6 carbon atoms and still more preferably one having 1 to 4 carbon atoms.

The alkyl group may be linear or branched chain.

$R^{31}$ and $R^{32}$ are identical or different and are preferably each at least one selected from the group consisting of —CH$_3$, —CF$_3$, —CHF$_2$, and —CH$_2$F, —C$_2$H$_5$, —CH$_2$CF$_3$, —CH$_2$CHF$_2$ and —CH$_2$CF$_2$CF$_2$H.

In this case, at least one of $R^{31}$ and $R^{32}$ is at least one selected from the group consisting of —CF$_3$, —CHF$_2$, —CH$_2$F, —CH$_2$CHF$_2$, —CH$_2$CF$_3$ and —CH$_2$CF$_2$CF$_2$H.

The fluorinated chain carbonate is preferably at least one selected from the group consisting of the following compounds.

[Formula 4]

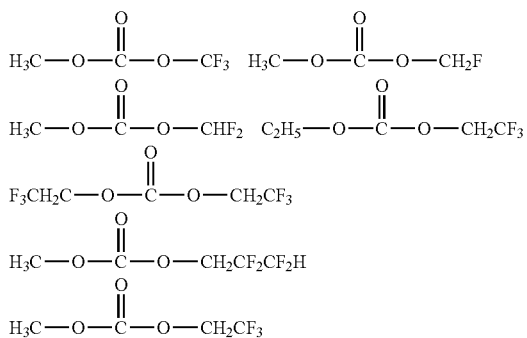

As the fluorinated esters, preferable are ones represented by the formula (5):

[Formula 5]

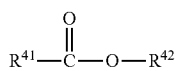
(5)

wherein $R^{41}$ and $R^{42}$ are identical or different and each represent an alkyl group optionally having an ether bond and optionally having a fluorine atom, and are optionally bonded to each other to form a ring; provided that either one of $R^{41}$ and $R^{42}$ has a fluorine atom.

The alkyl group is preferably one having 1 to 10 carbon atoms, more preferably one having 1 to 6 carbon atoms and still more preferably one having 1 to 4 carbon atoms.

The alkyl group may be linear or branched chain.

$R^{41}$ and $R^{42}$ are identical or different and are preferably each at least one selected from the group consisting of $-CH_3$, $-C_2H_5$, $-CHF_2$, $-CH_2F$, $-CH(CF_3)_2$, $-CHFCF_3$, $-CF_3$ and $-CH_2CF_3$.

In this case, at least one of $R^{41}$ and $R^{42}$ is at least one selected from the group consisting of $-CHF_2$, $-CH(CF_3)_2$, $-CHFCF_3$, $-CF_3$ and $-CH_2CF_3$.

$R^{41}$ and $R^{42}$ being bonded to each other to form a ring means that $R^{41}$ and $R^{42}$ together form the ring with a carbon atom and an oxygen atom to which $R^{41}$ and $R^{42}$ are bonded, respectively, and $R^{41}$ and $R^{42}$ constitute a part of the ring as fluorinated alkylene groups. In the case where $R^{41}$ and $R^{42}$ are bonded to each other to form the ring, $R^{41}$ and $R^{42}$ are preferably each at least one selected from the group consisting of $-CH_2CH_2CH(CH_2CF_3)-$, $-CH(CF_3)CH_2CH_2-$, $-CHFCH_2CH_2-$, $-CH_2CH_2CHF-$ and $-CH_2CH_2CH(CF_3)-$.

The fluorinated ester is preferably at least one selected from the group consisting of the following compounds.

[Formula 6]

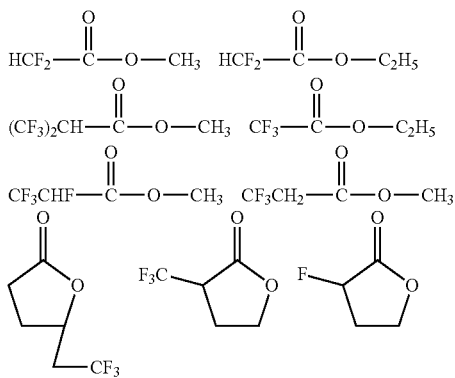

Alternatively, the electrolytic solution of the present disclosure may further contain a cyclic borate ester. The electrolytic solution containing the cyclic borate ester can have a better capacity retention.

The cyclic borate ester is not limited, and is preferably, for example, at least one selected from the group consisting of the following compounds.

[Formula 7]

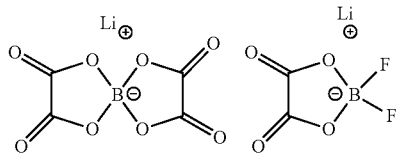

It is preferable that the electrolytic solution of the present disclosure contains the above-mentioned cyclic borate ester preferably in 0.01% by weight or more and more preferably in 1.0% by weight or more. The upper limit is not limited, and is preferably 1.0% by weight.

Alternatively, the electrolytic solution may be a nonaqueous electrolytic solution.

Further, the electrolytic solution of the present disclosure may be a gel electrolytic solution which is gelatinous. The gel electrolytic solution has a constitution configured by injecting an electrolytic solution in a matrix polymer composed of an ion-conductive polymer. As this electrolytic solution, the above-mentioned electrolytic solution of the present disclosure is used. Examples of the ion-conductive polymer to be used as the matrix polymer include polyethylene oxide (PEO), polypropylene oxide (PPO), polyethylene glycol (PEG), polyacrylonitrile (PAN), copolymers of vinylidene fluoride-hexafluoropropylene (VDF-HEP), polymethyl methacrylates (PMMA), and copolymers thereof. Electrolytic solution salts such as lithium salts can well be dissolved in polyalkylene oxide-based polymers.

(Battery)

The electrolytic solution of the present disclosure, though being capable of being used as an electrolytic solution in various types, regardless of kinds, of batteries, can suitably be used particularly for a battery having a positive electrode or a negative electrode containing a sulfur-containing electrode active material containing at least one selected from the group consisting of simple sulfur, lithium polysulfides ($Li_2S_n$: $1 \leq n \leq 8$) and organosulfur compounds. Such a battery corresponds to a battery generally called a lithium-sulfur secondary battery. The above battery including the above-mentioned electrolytic solution as an electrolytic solution is also one aspect of the present disclosure. Hereinafter, such a battery will be described in detail.

A lithium-sulfur secondary battery of the present disclosure has a positive electrode or a negative electrode having a sulfur-containing electrode active material, the above-mentioned electrolytic solution of the present disclosure, and a counter electrode of the positive electrode or the negative electrode.

The alkali metal-sulfur-containing secondary battery involved in the present disclosure can be configured, for example, to have such a structure that: the above positive electrode or negative electrode and the counter electrode are disposed separately from each other through a separator; the electrolytic solution is made to be contained in the separator to constitute a cell; and a plurality of the cells are laminated or the cell is wound and housed in a case. Current collectors of the positive electrode or negative electrode and the counter electrode are led outside the case, and electrically connected to tabs (terminals), respectively. As the electrolytic solution, alternatively, the gel electrolytic solution may be used.

<Positive Electrode or Negative Electrode Having a Sulfur-Containing Electrode Active Material>

The positive electrode or negative electrode has a sulfur-containing electrode active material containing at least one selected from the group consisting of simple sulfur, lithium polysulfides ($Li_2S_n$: $1 \leq n \leq 8$) and organosulfur compounds. The organosulfur compounds include organic disulfide compounds and carbon sulfide compounds.

The positive electrode or negative electrode, in addition to the above-mentioned sulfur-containing electrode active material, may contain a binder and a conductive agent. Then, a slurry (paste) of these electrode materials is applied and dried on a conductive carrier (current collector) to make the electrode materials to be carried on the carrier, whereby the positive electrode or negative electrode can be produced. The current collector includes conductive metals, such as aluminum, nickel, copper or stainless steel, formed into a foil, a mesh, an expanded grid (expanded metal), a punched metal or the like. Alternatively, a resin having conductivity or a resin containing a conductive filler may be used as the current collector. The thickness of the current collector is, for example, 5 to 30 μm, but is not limited in this range.

The content of the sulfur-containing electrode active material in the above electrode materials (the total amount of the sulfur-containing electrode active material and the other components, excluding the current collector) is preferably 50 to 98% by weight and more preferably 80 to 98% by weight. When the content of the active material is in the above range, since the energy density can be raised, the case is suitable.

The thickness of the electrode materials (thickness of one layer of applied layers) is preferably 10 to 500 μm, more preferably 20 to 300 μm and still more preferably 20 to 150 μm.

As the binder, there can be used polyethylene (PE), polypropylene (PP), polyethylene terephthalate (PET), polyether nitrile (PEN), polyimide (PI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVDF), polyvinyl alcohol (PVA), polyacrylic acid (PAA), lithium polyacrylate (PAALi), polyalkylene oxide such as a ring-opened polymer of ethylene oxide or a monosubstituted epoxide, or a mixture or the like of these.

The conductive agent is an additive that is added in order to improve the conductivity, and there can be used graphite, carbon powder such as Ketjen black, inverse opal carbon or acetylene black, carbon fibers such as vapor-grown carbon fibers (VGCF) or carbon nanotubes (CNT), or the like. Alternatively, the electrode materials may contain a supporting salt (a component contained in an electrolytic solution described below).

<Counter Electrode>

In the case where the positive electrode has the above-mentioned sulfur-containing electrode active material, the negative electrode to become a counter electrode thereof contains one or two or more negative electrode active materials selected from the group consisting of lithium, sodium, lithium alloys, sodium alloys and composites of lithium/inactive sulfur. The negative electrode active material contained in the negative electrode acts so as to occlude and release alkali metal ions. The negative electrode active material is preferably at least one selected from the group consisting of lithium, sodium, carbon, silicon, aluminum, tin, antimony and magnesium.

More specifically, as the negative electrode active material, there can be used conventionally well-known negative electrode materials including metal materials, such as lithium titanate, lithium metal, sodium metal, lithium aluminum alloys, sodium aluminum alloys, lithium tin alloys, sodium tin alloys, lithium silicon alloys, sodium silicon alloys, lithium antimony alloys and sodium antimony alloys, and carbon materials of crystalline carbon materials, non-crystalline carbon materials or the like, such as natural graphite, artificial graphite, carbon black, acetylene black, graphite, activated carbon, carbon fibers, coke, soft carbon and hard carbon.

Among these, it is desirable to use a carbon material or lithium or a lithium transition metal composite oxide, because these can constitute a battery excellent in the input/output characteristics. As the case may be, alternatively, two or more negative electrode active materials may concurrently be used.

In the case where the negative electrode has the above sulfur-containing electrode active material, as the positive electrode to become a counter electrode thereof, there can be used ones containing a positive electrode active material which occludes and releasing alkali metal ions. The positive electrode active material is preferably a lithium transition metal composite oxide, and examples thereof include Li—Mn-based composite oxides such as $LiMn_2O_4$ and Li—Ni-based composite oxides such as $LiNiO_2$. The positive electrode active material more specifically preferably includes $LiMn_2O_4$, $LiCoO_2$, $LiNiO_2$, $LiFePO_4$, $LiMnPO_4$, $LiCo_{0.5}Ni_{0.3}O_2$ and $LiNi_{0.7}Co_{0.2}Mn_{0.1}O_2$. Further, materials other than lithium can be used without limitations as long as being substances which electrochemically intercalate and release alkali metal ions, and examples thereof include sodium. Alternatively, two or more positive electrode active materials may concurrently be used.

The counter electrode also may contain the above-mentioned active material, binder and conductive agent. Then, these electrode materials are made to be carried on a conductive carrier (current collector), whereby the counter electrode can be produced. As the current collector, the same one as in the above can be used.

Between the positive electrode and the negative electrode, a separator is usually disposed. Examples of the separator include a glass fiber-made separator, and a porous sheet and a nonwoven fabric composed of a polymer, which absorb and hold an electrolytic solution described later. The porous sheet is constituted, for example, of a microporous polymer. Examples of the polymer constituting such a porous sheet include polyolefin such as polyethylene (PE) and polypropylene (PP), laminates having a three-layer structure of PP/PE/PP, polyimide and aramid. In particular, the polyolefin microporous separator and the glass fiber-made separator are preferable because having a property of being chemically stable to an organic solvent and being able to suppress the reactivity with the electrolytic solution low. The thickness of the separator composed of the porous sheet is not limited, and is, in applications to secondary batteries for driving vehicular motors, preferably 4 to 60 μm as the total thickness of a single layer or a multiple layer. Then, it is preferable that the diameter of micropores of the separator composed of the porous sheet is 10 μm or less at the largest (usually, about 10 to 100 nm), and the porosity is 20 to 80%.

As the nonwoven fabric, there is used, singly or as a mixture, conventionally well-known ones of cotton, rayon, acetate, Nylon®, polyester, polyolefin such as PP and PE, polyimide, aramid and the like. The porosity of the nonwoven fabric separator is preferably 50 to 90%. Further, the thickness of the nonwoven fabric is preferably 5 to 200 μm and especially preferably 10 to 100 μm. When the thickness is smaller than 5 μm, the retention of the electrolytic solution worsens; and in the case of exceeding 200 μm, the resistance increases in some cases.

A module having the above lithium-sulfur secondary battery is one aspect of the present disclosure.

Examples

Hereinafter, the present disclosure will be described specifically based on Examples. In the following Examples, unless otherwise specified, "parts" and "%" represent "parts by weight" and "% by weight", respectively.

Ether compounds G used were the following compounds (G-1) to (G-4).

$$CH_3-O-CH_2-CH_2-O-CH_3 \quad (G\text{-}1)$$

$$CH_3-O-CH_2-CH_2-O-CH_2-CH_2-O-CH_3 \quad (G\text{-}2)$$

$$CH_3-O-CH_2-CH_2-O-CH_2-CH_2-O-CH_2-CH_2-O-CH_3 \quad (G\text{-}3)$$

$$CH_3-O-CH_2-CH_2-O-CH_2-CH_2-O-CH_2-CH_2-O-CH_2-CH_2-O-CH_3 \quad (G\text{-}4)$$

Then, an alkali metal salt used was lithium bis(trifluoromethanesulfonyl)amide (LiTFSA) or lithium hexafluorophosphate $LiPF_6$.

A compound G and an alkali metal salt were mixed in a mixing ratio, (alkali metal salt)/(compound G)=0.5, 1.0, 1.5 (in terms of molar ratio) in a glove box in an argon atmosphere. Further to the mixture, a compound I (the following formula) as a fluorinated ether was added in a predetermined proportion, thereby an electrolytic solution was prepared. Here, the mixing ratio of (compound I)/(alkali metal salt) was varied to 0.5, 1.0, 2.0 and 4.0 (in terms of molar ratio).

Compounds I (Fluorinated Ethers)

$$HCF_2CF_2OCH_2CH_3 \quad (I\text{-}1)$$

$$HCF_2CF_2OCH_2CH_2CH_3 \quad (I\text{-}2)$$

$$HCF_2CF_2OCH_2CH_2CH_2CH_3 \quad (I\text{-}3)$$

$$HCF_2CF_2CH_2OCF_2CF_2H \quad (I\text{-}4)$$

As other components, the following compound a to e was added in a predetermined amount indicated in Tables 1 to 4.

[Formula 8]

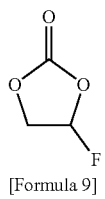

Compound a

[Formula 9]

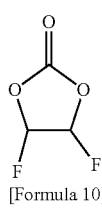

Compound b

[Formula 10]

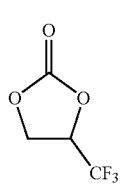

Compound c

[Formula 11]

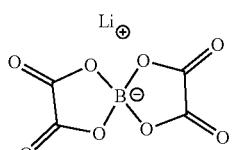

Compound d

[Formula 12]

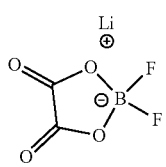

Compound e

<Preparation of Lithium-Sulfur Batteries>

There was prepared a positive electrode mixture slurry made by mixing a carbon composite material containing 40% by weight of sulfur as a positive electrode active material, a carbon black as a conductive material, a carboxymethyl cellulose (CMC) dispersed with pure water, and a styrene-butadiene rubber so that the solid content ratio thereof became 90/5/3/3 (ratio in % by weight). The obtained positive electrode mixture slurry was applied uniformly on an aluminum foil current collector of 20 μm in thickness, dried and thereafter compression molded by a press machine to thereby make a positive electrode. The positive electrode laminate was punched out into a size of a diameter of 1.6 cm by a punching machine to thereby prepare a circular positive electrode.

Separately, a negative electrode used was a circular lithium foil punched out into a size of a diameter of 1.6 cm.

The positive electrode and the negative electrode were faced to each other through a 20-μm thick microporous polyethylene film (separator); a nonaqueous electrolytic solution obtained in the above was injected; after the electrolytic solution sufficiently permeated in the separator and other components, the resultant cell was sealed, precharged and aged to thereby prepare coin-type alkali metal-sulfur-containing secondary batteries.

(Cycle Test)

The secondary batteries produced in the above, after being each previously discharged at 25° C. at a constant current equivalent to 0.05 C to 1.0 V, were each charged at a constant current equivalent to 0.05 C up to 3.0 V, and thereafter discharged at a constant current equivalent to 0.05 C down to 1.0 V; this cycle was taken as one cycle; and the initial discharge capacity was determined from the discharge capacity of the first cycle. Here, 1 C represents a current value at which the reference capacity of a battery is discharged in one hour; for example, 0.05 C represents a current value of 1/20 of that equivalent to 1 C. The cycle was repeated and the discharge capacity after 100 cycles was taken as a capacity after the cycles. The proportion of the discharge capacity after 100 cycles to the initial discharge capacity was determined and was taken as a cycle capacity retention (%)

Cycle capacity retention (%) = (a discharge capacity after 100 cycles)/(an initial discharge capacity) × 100

(Evaluation of the Output Characteristics)

After the 5th cycle mentioned above, the secondary batteries were charged at a constant current of 0.05 C until 3.0 V, and thereafter discharged at a constant current of 0.5 C until 1.0 V to determine the discharge capacity; and was compared to the discharge capacity at 0.05 C in the first cycle. The ratio was taken as the output characteristics (%).

Output characteristics (%) = (a discharge capacity at 0.5 C)/(a discharge capacity at 0.05 C) × 100

TABLE 1

|  | Example 1 | Example 2 | Example 3 | Example 4 | Example 5 | Example 6 | Example 7 |
|---|---|---|---|---|---|---|---|
| Alkali metal salt/Compound G | G-4 0.5 | G-4 1.0 | G-4 1.5 | G-3 1.0 | G-3 1.0 | G-3 1.0 | G-3 1.0 |
| Compound (I)/Alkali metal salt | I-2 0.5 | I-2 0.5 | I-2 0.5 | I-2 0.5 | I-3 0.5 | I-3 1.0 | I-3 1.5 |
| Other components |  |  |  |  |  |  |  |
| Alkali metal salt | LiTFSA | LiTFSA | LiTFSA | LiTFSA | LiTFSA | LiTFSA | LiTFSA |
| Capacity retention (%) | 82 | 80 | 81 | 80 | 84 | 85 | 87 |
| Output characteristics (%) | 71 | 70 | 67 | 66 | 77 | 78 | 81 |

TABLE 2

|  | Example 8 | Example 9 | Example 10 | Example 11 | Example 12 | Example 13 | Example 14 |
|---|---|---|---|---|---|---|---|
| Alkali metal salt/Compound G | G-3 1.0 | G-3 1.0 | G-3 1.0 | G-3 1.0 | G-3 1.0 | G-3 1.0 | G-3 1.0 |
| Compound (I)/Alkali metal salt | I-3 2.0 | I-3 4.0 | I-3 4.0 | I-3 2.0 | I-3 2.0 | I-3 2.0 | I-3 2.0 |
| Other components |  |  |  | Compound a 3.0 | Compound b 3.0 | Compound b 10 | Compound b 18 |
| Alkali metal salt | LiTFSA | LiTFSA | LiPF6 | LiTFSA | LiTFSA | LiTFSA | LiTFSA |
| Capacity retention (%) | 88 | 83 | 71 | 90 | 91 | 92 | 90 |
| Output characteristics (%) | 83 | 85 | 88 | 81 | 82 | 83 | 84 |

TABLE 3

|  | Example 15 | Example 16 | Example 17 | Example 18 | Example 19 | Example 20 |
|---|---|---|---|---|---|---|
| Alkali metal salt/Compound G | G-3 1.0 | G-3 1.0 | G-3 1.0 | G-3 1.0 | G-1 1.0 | G-2 1.0 |
| Compound (I)/Alkali metal salt | I-3 2.0 | I-3 2.0 | I-3 2.0 | I-3 2.0 I-4 0.1 | I-3 4.0 | I-3 4.0 |
| Other components | Compound c 3.0 | Compound d 1.0 | Compound e 1.0 |  |  |  |
| Alkali metal salt | LiTFSA | LiTFSA | LiTFSA | LiTFSA | LiTFSA | LiTFSA |
| Capacity retention (%) | 92 | 93 | 93 | 86 | 68 | 70 |
| Output characteristics (%) | 80 | 84 | 85 | 81 | 58 | 63 |

TABLE 4

|  | Comparative Example 1 | Comparative Example 2 | Comparative Example 3 | Comparative Example 4 | Comparative Example 5 |
|---|---|---|---|---|---|
| Alkali metal salt/Compound G | G-4 1.0 | G-4 1.0 | G-3 1.0 | G-3 1.0 | G-3 1.0 |

TABLE 4-continued

| | Comparative Example 1 | Comparative Example 2 | Comparative Example 3 | Comparative Example 4 | Comparative Example 5 |
|---|---|---|---|---|---|
| Compound (I)/Alkali metal salt | I-1 0.5 | I-4 0.5 | I-1 0.5 | I-4 4.0 | I-1 2.0 |
| Other components | | | | | Compound d 1.0 |
| Alkali metal salt | LiTFSA | LiTFSA | LiTFSA | LiPF6 | LiTFSA |
| Capacity retention (%) | 34 | 57 | 37 | 31 | 31 |
| Output characteristics (%) | 41 | 7 | 36 | 41 | 40 |

The results of Tables 1 to 4 make clear that the lithium-sulfur secondary batteries of the Examples using the electrolytic solution of the present disclosure exhibits excellent life characteristics, due to high discharge capacity retention after the cycle characteristics test. It also makes clear that the Examples gives remarkably larger output characteristics value than that of the Comparative Examples, and good discharge capacities.

INDUSTRIAL APPLICABILITY

The battery including the electrolytic solution of the present disclosure can be utilized as various power sources such as power sources for portable devices and power sources for vehicles.

The invention claimed is:

1. A lithium-sulfur secondary battery comprising a positive electrode or a negative electrode containing a sulfur-containing electrode active material containing at least one selected from the group consisting of simple sulfur, lithium polysulfides ($Li_2S_n$: $1 \leq n \leq 8$) and organosulfur compounds, wherein the lithium-sulfur secondary battery comprises an electrolytic solution comprising:
a fluorinated ether which is at least one selected from the group consisting of $HCF_2CF_2OCH_2CH_2CH_3$, $HCF_2CF_2CH_2OCH_2CH_3$, $HCF_2CF_2CH_2OCH_2CH_2CH_3$, $CF_3CHFCF_2OCH_2CH_3$ and $CF_3CHFCF_2OCH_2CH_2CH_3$;
an ether compound represented by formula (2):

$$R^4\text{—}(OCHR^3CH_2)_x\text{—}OR^5 \quad (2)$$

wherein $R^4$ and $R^5$ are each independently selected from the group consisting of alkyl groups having 1 to 9 carbon atoms and having no fluorine atom, a phenyl group optionally substituted by a halogen atom and a cyclohexyl group optionally substituted by a halogen atom, and optionally together form a ring; $R^3$ each independently represent H or $CH_3$; and x represents 0 to 10; and
an alkali metal salt.

2. The lithium-sulfur secondary battery according to claim 1, wherein the fluorinated ether is at least one selected from the group consisting of $HCF_2CF_2CH_2OCH_2CH_3$, $HCF_2CF_2CH_2OCH_2CH_2CH_3$, $CF_3CHFCF_2OCH_2CH_3$ and $CF_3CHFCF_2OCH_2CH_2CH_3$.

3. The lithium-sulfur secondary battery according to claim 1, wherein the fluorinated ether represented by the formula (1) and the ether compound represented by the formula (2) in total is 60% by weight or more of a solvent in the electrolytic solution.

4. The lithium-sulfur secondary battery according to claim 1, wherein the ether compound is at least one selected from the group consisting of tetrahydrofuran (THF), 1,3-dioxolane, 1,4-dioxane, glymes, and derivatives thereof.

5. The lithium-sulfur secondary battery according to claim 1, wherein the alkali metal salt is represented by LiX; and
X is at least one selected from the group consisting of Cl, Br, I, $BF_4$, $PF_6$, $CF_3SO_3$, $ClO_4$, $CF_3CO_2$, $AsF_6$, $SbF_6$, $AlCl_4$, bistrifluoromethanesulfonylamide (TFSA), $N(CF_3SO_2)_2$, $N(CF_3CF_2SO_2)_2$, $PF_3(C_2F_5)_3$, $N(FSO_2)_2$, $N(FSO_2)(CF_3SO_2)$, $N(CF_3CF_2SO_2)_2$, $N(C_2F_4S_2O_4)$, $N(C_3F_6S_2O_4)$, $N(CN)_2$, $N(CF_3SO_2)(CF_3CO)$, $R^6FBF_3$ wherein $R^6F$ is $n\text{-}C_mF_{2m+1}$ and m is a natural number of 1 to 4, and $R^7BF_3$ wherein $R^7$ is $n\text{-}C_pH_{2p+1}$ and p is a natural number of 1 to 5.

6. The lithium-sulfur secondary battery according to claim 1, comprising a positive electrode containing a sulfur-containing electrode active material.

7. A module, comprising the lithium-sulfur secondary battery according to claim 1.

8. The lithium-sulfur secondary battery according to claim 1, wherein the fluorinated ether is at least one selected from the group consisting of $HCF_2CF_2OCH_2CH_2CH_3$, $HCF_2CF_2CH_2OCH_2CH_2CH_3$, $CF_3CHFCF_2OCH_2CH_3$ and $CF_3CHFCF_2OCH_2CH_2CH_3$.

9. The lithium-sulfur secondary battery according to claim 1, wherein the fluorinated ether is at least one selected from the group consisting of $HCF_2CF_2OCH_2CH_2CH_3$, $HCF_2CF_2CH_2OCH_2CH_3$, $CF_3CHFCF_2OCH_2CH_3$ and $CF_3CHFCF_2OCH_2CH_2CH_3$.

10. The lithium-sulfur secondary battery according to claim 1, wherein the fluorinated ether is at least one selected from the group consisting of $HCF_2CF_2OCH_2CH_2CH_3$, $HCF_2CF_2CH_2OCH_2CH_3$, $HCF_2CF_2CH_2OCH_2CH_2CH_3$, and $CF_3CHFCF_2OCH_2CH_2CH_3$.

11. The lithium-sulfur secondary battery according to claim 1, wherein the fluorinated ether is at least one selected from the group consisting of $HCF_2CF_2OCH_2CH_2CH_3$, $HCF_2CF_2CH_2OCH_2CH_3$, $HCF_2CF_2CH_2OCH_2CH_2CH_3$, and $CF_3CHFCF_2OCH_2CH_3$.

* * * * *